(12) United States Patent
Laurent

(10) Patent No.: US 7,477,874 B2
(45) Date of Patent: Jan. 13, 2009

(54) METHOD AND DEVICE FOR THE REJECTION OF SELF-ADAPTIVE INTERFERENCE

(75) Inventor: Pierre-André Laurent, Bessancourt (FR)

(73) Assignee: Thales, Neuilly sur Seine (FR)

( * ) Notice: Subject to any disclaimer, the term of this patent is extended or adjusted under 35 U.S.C. 154(b) by 999 days.

(21) Appl. No.: 10/845,511

(22) Filed: May 14, 2004

(65) Prior Publication Data

US 2004/0266353 A1   Dec. 30, 2004

(30) Foreign Application Priority Data

May 16, 2003   (FR) .................................. 03 05910

(51) Int. Cl.
*H04B 1/00* (2006.01)
*H04B 15/00* (2006.01)

(52) U.S. Cl. ................ 455/63.1; 455/67.11; 455/67.13; 455/226.1; 455/296; 375/147; 375/148; 375/346

(58) Field of Classification Search ................ 455/63.1, 455/67.11, 67.13, 67.16, 226.1–3, 278.1, 455/295–296; 375/229–236, 343–351, 147–153

See application file for complete search history.

(56) References Cited

U.S. PATENT DOCUMENTS

| | | | |
|---|---|---|---|
| 4,382,232 A | 5/1983 | Laurent | |
| 4,501,004 A | 2/1985 | Yoshida et al. | |
| 4,799,241 A | 1/1989 | Laurent | |
| 5,410,750 A | 4/1995 | Cantwell et al. | |
| 5,572,249 A * | 11/1996 | Ghosh | ......................... 348/21 |
| 6,094,408 A * | 7/2000 | Verboom | ................. 369/47.17 |
| 6,418,300 B1 | 7/2002 | Laurent | |
| 6,810,342 B1 * | 10/2004 | Gulden et al. | ................. 702/76 |
| 7,023,903 B2 * | 4/2006 | Karna | ....................... 375/147 |

* cited by examiner

*Primary Examiner*—Tuan A Tran
(74) *Attorney, Agent, or Firm*—Lowe Hauptman Ham & Berner, LLP

(57) ABSTRACT

A device and a method for the rejection of interference in a payload signal are described. The method includes evaluating the interference phase and evaluating the instantaneous amplitude of the interference by the least error squares method, forming a ratio $r=(B^2/(A^2+B^2))$ where A is the real part of the amplitude of the interference and B is the complex part of the amplitude of the interference. If r is below the threshold value r0, the signal is corrected by replacing the central sample of the signal by a weighted sum moderated by the central sample and neighboring samples.

9 Claims, 3 Drawing Sheets

COMPUTATION OF COMPLEX EXPONENTIALS

MULTIPLICATION AND SUMMATION OPERATIONS

METHOD AND DEVICE FOR THE REJECTION OF SELF-ADAPTIVE INTERFERENCE

BACKGROUND OF THE INVENTION

1. Description of the Prior Art

The invention relates to a device and a method for the rejection of interference in a signal.

It can be applied notably in the context of telecommunications where the payload signal received may be subjected to the addition of powerful jamming or interference phenomena which, however, are completely different from thermal noise. This parasitic signal is mostly "narrowband noise" compared with the payload signal, i.e., it can be locally likened to a pure carrier of almost-constant amplitude with a "slowly" variable frequency.

The invention is applicable to the rejection of any signal that can be likened to a narrowband signal.

2. Description of the Prior Art

In the prior art, there are essentially three techniques used to reject the interference referred to in the present invention.

The first technique, known as the Frequency Selective Limiter or FSL technique consists of the processing of a signal in blocks which generally overlap one another. For each block, the transform of the signal is computed and is then compared with the theoretical value that it should have. In the next processing operation, for each complex value of said transform, the amplitude (and not the phase) is modified in such a way that the effects of the interference are as small as possible. Such a modification may consist in giving the theoretical amplitude to all the points, setting those points whose amplitude is "too high" at zero or using any other appropriate processing operation. An inverse Fourier transform reconstitutes the signal which, in principle, is rid of the interference.

The second technique is that of "adaptive filtering" which consists of the continuous adjustment of the coefficients of a filter known as a "predictive" filter to minimize the mean square error between the signal that it predicts and the preceding signal samples. The inverse filter of the predictor is then used to filter the signal so as rid it of the majority of the interference or jamming phenomena that affect it Finally, the third technique known as the "rejection filter" technique consists in estimating the long-term frequency spectrum of the interference phenomena, computing a filter that attenuates the signal received in the frequency band or frequency bands and applying the filter before demodulation.

SUMMARY OF THE INVENTION

The object of the invention relates to a novel approach enabling the rejection of the interference of a parasitic signal notably when it is liable to hamper the detection of payload information.

The invention relates to a method for the rejection of interference in a payload signal. It is characterized in that it comprises at least the following steps:

a) evaluating the interference phase and evaluating the instantaneous amplitude of the interference by the least error squares method, b) forming the ratio $r=(B^2/(A^2+B^2))$ where A is the real part of the amplitude of the interference and B is the complex part of the amplitude of the interference, c) if r is below the threshold value r0, correcting the signal by replacing the central sample of the signal by a weighted sum formed by itself and neighboring samples.

The interference phase is for example evaluated by using a parabolic law and the amplitude of interferences is evaluated by the least error squares method.

The weighting coefficients used for the sum of the step c) are expressed for example by the following formulae:

$$w(0) = \frac{2K(A^2 + B^2 + dAB2) + xy2}{(2K+1)(A^2 + B^2 + dAB2) + xy2}$$

$$w(k) = -\frac{A^2 + B^2 + dAB2}{(2K+1)(A^2 + B^2 + dAB2) + xy2} e^{j(teta(0)-teta(k))}$$

$$k \neq 0$$

where K is the number of samples considered, k is the index of the sample,
A and B are the complex amplitudes of the interference,
dAB2 is the mean square error of estimation of A+jB,
xy2 is the mean power of the signal,
teta(k) is the sequence of the smoothened phases.

The invention also relates to a system for the rejection of interference phenomena in a signal comprising at least one decision-making device using the coefficients A, B of the complex amplitudes of the interference and a device for the processing of the signal linked with the decision-making means, the processing device being adapted to the elimination, from a chosen sample of the signal, of the interference estimated from the neighboring samples and preceding samples of the chosen sample.

It comprises for example a selection device enabling the selection, as a chosen sample, of the central sample of the signal.

The processing device comprises for example a device for the estimation of the phase of the signal by means of a parabolic law, a device for the estimation of the complex amplitude of the signal, in order to determine the ratio of the decision-making threshold.

The system may comprise an automatic gain control device placed before the correction means and a limiter device placed after the signal-correction means.

The invention has the advantage notably of correcting the signal only when this proves to be necessary.

BRIEF DESCRIPTION OF THE DRAWINGS

Other features and advantages of the invention shall appear more clearly from the following description of an example given by way of an illustration that in no way restricts the scope of the invention and the appended figures, of which.

MORE DETAILED DESCRIPTION

Figure 1:
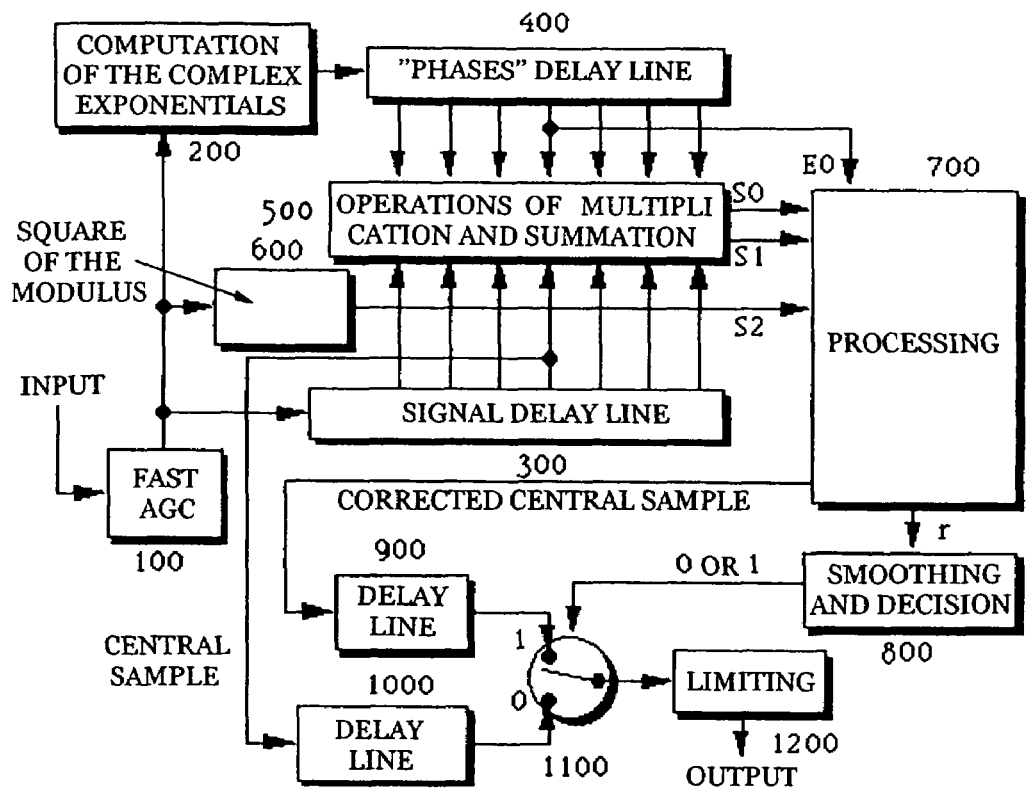
FIG. 1 exemplifies the architecture of a rejection device according to the invention.

In order to provide a clearer understanding of the object of the invention, the following description, given by way of an illustration that in no way restricts the scope of the invention, relates to a system for the rejection of interference designed to enable the operation of receivers in the presence of very strong interference phenomena.

With the signal received by a receiver comprising an interference rejection system according to the invention, the method of the invention comprises for example at least the following steps:
1) estimating the "interference" phase and estimating the amplitude of the "interference",
2) comparing the weight of the real part and the weight of the complex part, of the estimated signal,
3) forming the ratio $r=B^2/(A^2+B^2)$ and comparing this ratio with a given threshold value,
4) if the value of r is below this threshold value, then correcting the signal through the elimination, from the central signal sample, of the interference estimated from the neighboring samples.

The different steps are described in detail hereinafter in the description.

For the type of basic systems envisaged in the present invention, the payload signal should be capable of being received accurately (i.e. with a very low error rate) with a low signal-to-noise ratio, namely a ratio typically lower than 0 dB (where the noise is more powerful than the signal).

The Estimation of the Interference (or Jamming) Phase

The method works for example on the basis of a received signal sample referenced r(0) and its preceding neighbors r(−n) ... r(−1) and its following neighbors r(1) ... r(n).

If we assume that the interference is strong, the phase of the samples r(i) is in practice close to the phase of the interference, disturbed by the payload signal and the noise. Said phases are denoted phi(−n) ... phi(n).

Since the interference has a frequency that varies slowly, these phases can be approximated by a locally parabolic law obtained by quadratic regression, after removal of the ambiguities.

The locally parabolic law can also be used with interference phenomena or jamming whose frequency changes discretely (FSK interference, with two or more tones) because, during transitions between two tones, the filters necessarily used in the receiver tend to make the frequency variation "continuous".

The removal of ambiguity is done for example as follows, where the function a tan2(y, x) gives the phase (between−PI and +PI) of a complex signal having the form z=x+jy:
  do phi(−n)=a tan 2(Im(r(−n), Re(r(−n))
  for i=1−n ... n, do:
    phi(i)=a tan2(Im(r(i), Re(r(i))
    if phi(i) is greater than phi(i−1)+PI do phi(i)=phi(i)+2 P
    if phi(i) is lower than phi(i−1)+PI do phi(i)=phi(i)−2 PI
The quadratic regression then consists in minimizing the total error E given by:

$$E = \sum_{i=-n}^{i=n} (ai^2 + bi + c - \text{phi}(i))^2 \quad (1)$$

The solution is given by the following expressions:

$$a = \frac{15(-(n s0) - n^2 s0 + 3 s2)}{n(1+n)(-1+2n)(1+2n)(3+2n)} \quad (2)$$

$$b = \frac{3 s1}{n(1+n)(1+2n)}$$

$$c = \frac{3(-s0 + 3 n s0 + 3 n^2 s0 - 5 s2)}{(-1+2n)(1+2n)(3+2n)}$$

with:

$$s0 = \sum_{i=-n}^{i=n} \text{phi}(i) \quad s1 = \sum_{i=-n}^{i=n} i\, \text{phi}(i) \quad s2 = \sum_{i=-n}^{i=n} i^2 \text{phi}(i) \quad (3)$$

The computation can be done by iteration as follows:

$s2(t)=s2(t-1)-2s1(t-1)+s0(t-1)-(n+1)^2\text{phi}(t-n-1)+n^2\text{phi}(t+n)$ $s1(t)=s1(t-1)-s0(t-1)+(n+1)\text{phi}(t-n-1)+n\, \text{phi}(t+n)$ $s0(t)=s0(t-1)+\text{phi}(t+n)-\text{phi}(t-n-1)$ The estimated phase of the central sample indexed 0, at the instant t, is simply equal to c.

teta(k) denotes the sequence of the smoothened phases.

Estimation of the Amplitude of the Interference or of the Jammer

It is assumed that, in the vicinity of the instant of observation, the interference phenomena have the form:

$$br(k)=(A+jB)(\cos(\text{teta}(k))+j\sin(\text{teta}(k))) \quad (4)$$

Given that the majority of the received signal is formed by interference phenomena, the components of the complex amplitude of the interferences A and B are estimated by the following simple equation, in which we consider the central received signal sample ranked k=0 and its K neighbors on either side:

$$Z = \frac{1}{2K+1} \sum_{k=-K}^{k=K} r(k)(\cos(\text{teta}(k)) - j\sin(\text{teta}(k))) \quad (5)$$

$$A = \text{Re}(Z), B = \text{Im}(Z)$$

r(k) corresponds to the sample k of the received signal.

The error that distorts this estimation is subsequently evaluated.

Since the payload signal itself is unknown, the method estimates its mean power. For the estimation, we consider decorrelated signal samples, so much so that two successive values of k relate to two received signal samples spaced out, for example, by the inverse of the modulation rhythm expressed in bauds.

Furthermore, the error made on the phases teta(k), is assumed to be negligible: the interference is supposed to really have these phases.

A0 and B0 denote the true values of the components of the complex amplitude of the interference, dA and dB denote the errors A−A0 and B−B0, and x(k)+j y(k) denotes the payload signal itself. The following is written:

$$r(k)=(A0+jB0)(\cos(\text{teta}(k))+j\sin(\text{teta}(k)))+(x(k)+j\,y(k)) \quad (6)$$

The errors of the components of the complex amplitude of the interference is then expressed by the following relationships:

$$dA = A - A0 = \frac{1}{2K+1} \sum_{k=-K}^{k=K} x(k)\cos(teta(k)) - y(k)\sin(teta(k)) \quad (7)$$

$$dB = B - B0 = \frac{1}{2K+1} \sum_{k=-K}^{k=K} x(k)\sin(teta(k)) + y(k)\cos(teta(k))$$

The root mean square error of estimation of A+jB (complex amplitude of interference) is given by the following relationship:

$$dAB2 = \langle dA^2 + dB^2 \rangle = \frac{\langle x(k)^2 + y(k)^2 \rangle}{2K+1} = \frac{xy2}{2K+1} \quad (8)$$

In the method, then, an estimation is made of xy2, corresponding to the mean power of the signal. This step is performed, for example, in computing the difference between the mean power of the signal and the estimated power of the interference. This leads to:

$$delta = \frac{1}{2K+1} \sum_{k=-K}^{k=K} |r(k)|^2 - (A^2 + B^2) \quad (9)$$

Its mathematical expectation is then:

$$\langle delta \rangle = A0^2 + B0^2 + \frac{1}{2K+1} \sum_{k=-K}^{k=K} \langle x(k)^2 + y(k)^2 \rangle - \langle (A0+dA)^2 + (B0+dB)^2 \rangle \quad (10)$$

giving:

$$\langle delta \rangle = xy2 - (dA^2 + dB^2) = xy2 - dAB2$$

$$\langle delta \rangle = \frac{2K\,xy2}{2K+1}$$

The mean estimated power of the signal is:

$$xy2 = \frac{2K+1}{2K} delta \quad (11)$$

and
the estimated root mean square error of the interference is:

$$dAB2 = \frac{delta}{2K} \quad (12)$$

Correction of the Received Signal

When the decision to correct the signal is taken, the method comprises a step in which the rejecter tries to make the best possible estimation of the central signal sample by linear combination of itself and of its 2 K left-hand and right-hand neighbors. This linear combination is optimized to minimize the square of the modulus of the estimation error. If the estimated signal is denoted zEst0, we write:

$$zEst0 = \sum_{k=-K}^{k=K} w(k)\,r(k) \quad (13)$$

that is, in considering the true value of the amplitude of the interference:

$$zEst0 = \sum_{k=-K}^{k=K} w(k)((A0+jB0)(\cos(teta(k)) + j\sin(teta(k))) + (x(k)+j\,y(k))) \quad (14)$$

The complex weighting operations w(k) are adjusted so as to minimize the mathematical expectancy of the root mean square error of estimation, namely:

$$\langle E \rangle = \langle |zEst0 - (x(0)+j\,y(0))|^2 \rangle \quad (15)$$

$$\langle E \rangle = xy2\left(1 - w(0) - w(0)^* + \sum_{k=-K}^{k=K} w(k)w(k)^*\right) + (A^2 + B^2 + dAB2) \sum_{k=-K}^{k=K} w(k)\,e^{j\,teta(k)} \sum_{k=-K}^{k=K} w(k)^*\,e^{-j\,teta(k)}$$

The solution that minimizes this quantity leads to the complex weighting coefficients:

$$w(0) = \frac{2K(A^2+B^2+dAB2)+xy2}{(2K+1)(A^2+B^2+dAB2)+xy2} \quad (16)$$

$$w(k) = -\frac{A^2+B^2+dAB2}{(2K+1)(A^2+B^2+dAB2)+xy2} e^{j(teta(0)-teta(k))}$$

$$k \neq 0$$

To obtain the solution, it may be considered that w(0) is necessarily real so as not to change the phase of the payload signal (at the center) and that the values w(k) all have the same importance and must subtract and "rectify" the sample of the interference that is assigned to them.

The minimum root mean square error thus obtained is:

$$\langle E \rangle = \frac{(A^2+B^2+dAB2)xy2}{(2K+1)(A^2+B^2+dAB2)+xy2}$$

$$\langle E \rangle = \frac{(A0^2+B0^2)xy2}{(2K+1)(A0^2+B0^2)+xy2}$$

Expressed from the power of the signal (S) and that of the interference (J for "jammer"), the root mean square error is expressed as:

$$\langle E \rangle = \frac{S}{2K+1+\frac{S}{J}} \quad (17)$$

If P is the mean power of the signal, given by:

$$P = \frac{1}{2K+1} \sum_{k=-K}^{k=K} |r(k)|^2$$

we have:

$$\text{delta} = P - A^2 - B^2$$

$$xy2 = \frac{2K+1}{2K}(P - A^2 - B^2)$$

$$dAB2 = \frac{(P - A^2 - B^2)}{2K}$$

In the borderline case where A=B=0, the weighting coefficients are expressed as follows:

$$w(0) = \frac{1+4K}{2(1+2K)} \text{ voisin de } 1 \quad (18)$$

$$|w(k)| = \frac{1}{2(1+2K)} \text{ voisin de } 0$$

which amounts to keeping the central sample as such.

In the other borderline case, where the interference or scrambling is very powerful, the weighting coefficients are:

$$w(0) = \frac{2K}{1+2K} \text{ voisin de } 1 \quad (19)$$

$$|w(k)| = \frac{1}{(1+2K)} \text{ voisin de } 1/(2K)$$

which amounts to the removal, from the central sample r(0), of the estimated interference from neighboring samples r(−n) ... r(−1) ... r(1) ... r(n).

These coefficients are used to obtain the corrected value of the signal in using the formula:

$$zEst0 = \sum_{k=-K}^{k=K} w(k)r(k) \quad (20)$$

Decision to Correct the Received Signal

The step of deciding to correct the received signal is made for example as described here below.

When there is strong interference, the central signal sample is (almost) exclusively interference and its value, estimated from that of its neighbors, is very close to the observed value. The value of B is very small as compared with the value of A (after phase correction). A good criterion therefore consists in computing the ratio:

$$r = \frac{B^2}{A^2 + B^2} \quad (21)$$

The lower this ratio, the greater the power of the interference and the more relevant is the use of the rejecter.

The method comprises a step for comparing the value of the ratio r with a threshold r0 leading to a decision to use the rejecter when r is smaller than r0. The value r0 is for example adjusted experimentally according to the system. It is chosen for example to be equal to 0.001.

For a value of r that tends to fluctuate, especially if the power of the interference is not very high, the decision to use the rejecter is made on a filtered version of r. This filtered version is for example of the average computed on the 2 M samples neighboring the current sample.

Transients

When, from time to time, the interference abruptly changes its frequency (in the case of FSK interference with frequency switching), there is imperfect rejection of the end and beginning of the parts where the frequency is constant. This imperfect rejection then takes the form of interference pulses which are all the higher as the interference is powerful, sometimes even to the extent of preventing demodulation.

The method of the invention uses for example two devices which, for example, are cascade-connected:

fast automatic gain control (AGC) on the signal before the rejecter, the reaction time of the AGC being short as compared with the minimum duration of the interference pulses, and lengthy as compared with the bandwidth of the signal A limiter, after the rejecter, set so that:
the signal alone or the signal processed in the presence of high interference is never limited (or limited to an extent so small that it has no effect on performance)
during the transients, the limiter converts the residual interference pulses into far weaker pulses (at constant amplitude) so as not to disturb reception.

FIG. 1 exemplifies an architecture of the rejection device according to the invention. The device comprises for example at least the following elements:

a fast automatic gain control device 100 at input, receiving the signal to be processed (the signal formed by the payload signal and the interference), a system for the computation of the complex exponentials 200 implementing the signal phase computation processes, its correction, quadratic regression and the computation of the complex exponential values explained earlier (in the phase estimation step), a delay line 300 for the regulated signal, corresponding to 2 K+1 decorrelated samples, with a particular output for the central sample; an additional initial delay is planned to compensate for the delay introduced by the device 200 (detailed further below), a "phase" delay line" 400 for the complex exponentials, having the same length as the previous one, whose central output corresponds to the phase of the central sample and is denoted E0, a multiplication and summing system 500 that generates two outputs S0 and S1 respectively corresponding to the sample of the central signal and its neighbors in the past and future, a system 600 that computes the square of the modulus of the signal S2, a processing system 700 which, on the basis of the quantities S0, S1, S2 and Po, sees to preparing the corrected central signal sample and the quantity r from which the rejection/non-rejection switching will be made with Po representing the phase of the central sample, the smoothing system 800 which decides on the switching; it smoothens the quantity r, two delay lines 900 and 1000 designed to synchronize the uncorrected central sample, the corrected central sample, and the decision taken for switching or not switching, a switch 1100 used to choose the corrected or uncorrected sample as a function of the decision, a limiter 1200 that eliminates the interference pulses resulting from transients during sudden changes in the frequency of the interference.

Figure 2:
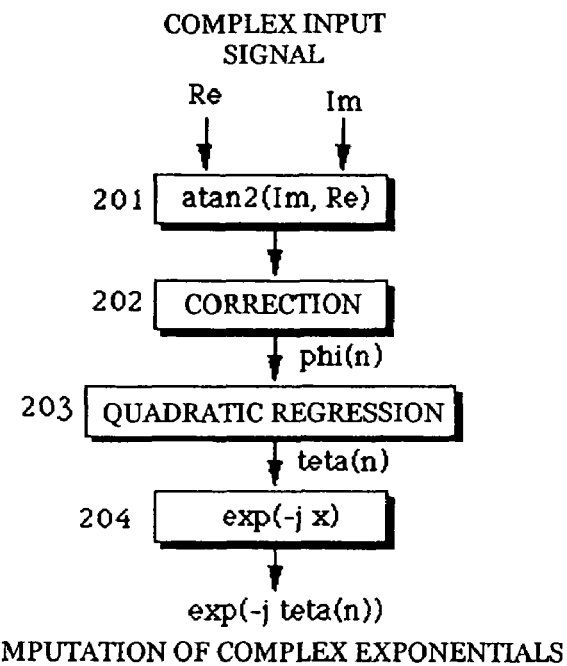
FIG. 2 is a detailed view of a system for computing the complex exponentials of FIG. 1.

FIG. 2 is a diagrammatic and detailed view of the system for the computation of the complex exponential values.

The device 200 comprises, in the following order:

a system for the computation of the phase of the samples of the signal assumed to have the form Re+j Im either by software program (a tan2 function with two arguments) or by other means, for example the algorithm known as CORDIC described in books known to those skilled in the art of signal processing; it must be noted that since the signal generally has a low signal-to-noise ratio, a relatively coarse evaluation of the phase can be accepted (for example, a 1/256 th turn). The phase is given between −Pi and +Pi, the correction system 202 makes the +2 Pi or −2 Pi corrections providing the maximum phase continuity, the device 203 carries out the iterative computation of the coefficients a, b, c of the local quadratic approximation of the fears and outputs the estimated phase at the center of the computation range, the system 204 computes the complex exponential associated with said phase, for example in reading a table at the appropriate address.

Figure 3:
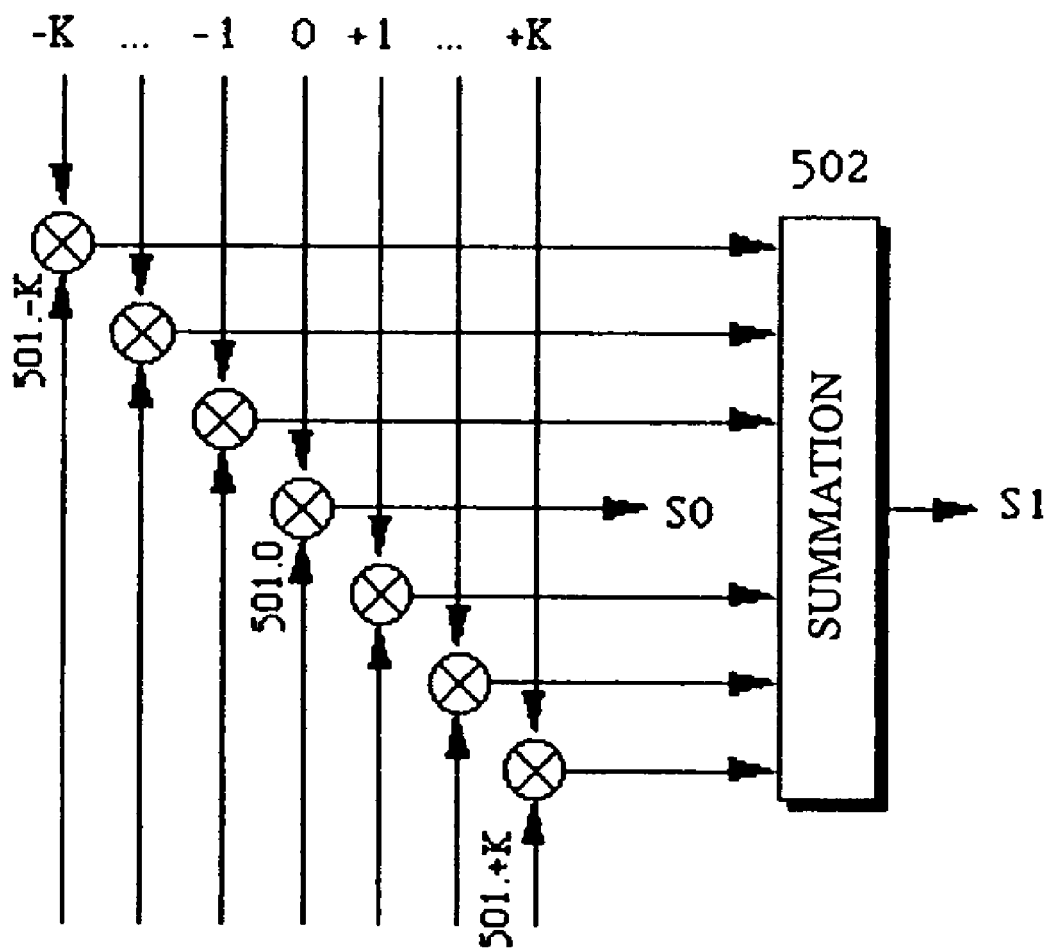
FIG. 3 shows a multiplication and information system of FIG. 1.

FIG. 3 gives a detailed view of a multiplication and summation system.

The summation system 500 uses multipliers 501.−K . . . 501.0 . . . 501.+K to carry out the multiplication of the output samples of the signal delay lines 300 and "phases" 400.

The output of the multiplier 501.0 gives the output signal S0.

The outputs of the other multipliers are summated to generate the signal S2, which is the sum of the products of the samples neighboring the central sample corrected by their respective estimated phases.

Figure 4:
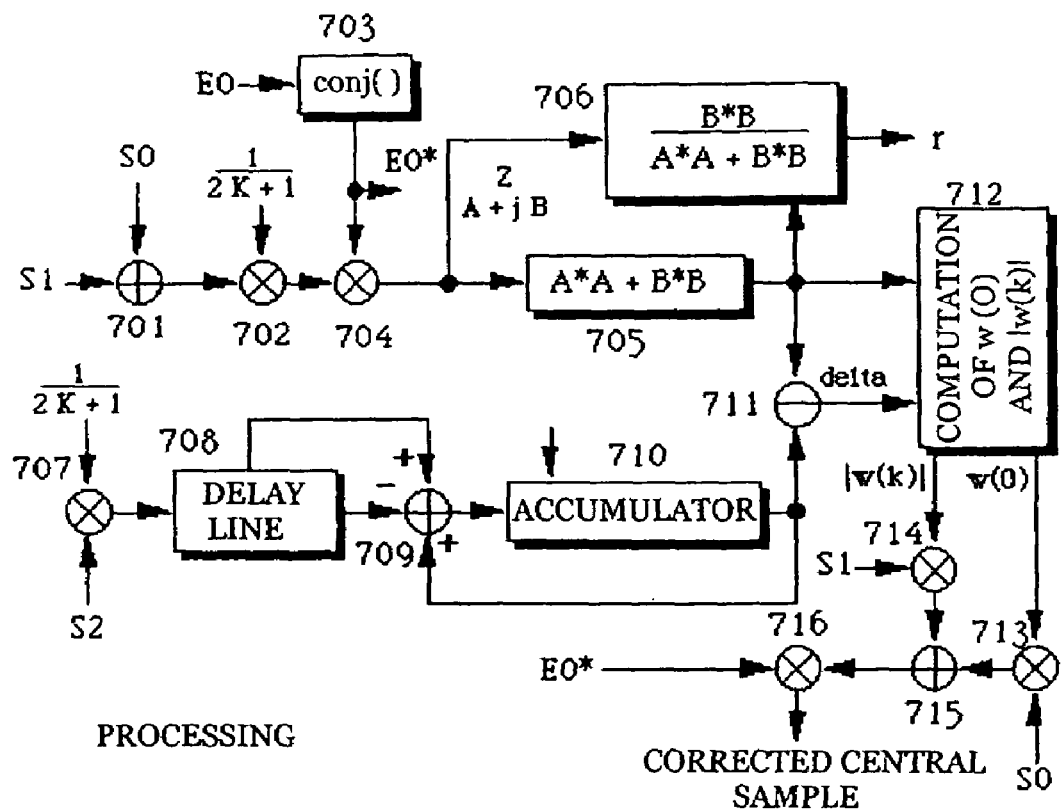
FIG. 4 is a detailed view of the processing system of FIG. 1.

FIG. 4 is a diagrammatic and detailed view of the processing system 700.

The system 700 computes the corrected central signal sample and the quantity r from which the rejection/non-rejection switching will be done on the basis of the quantities S0, S1, S2 and Po.

The quantities S0 and S1 are summated in the adder 701, and the sum is multiplied by 1/(2 K+1) in the multiplier 702 and by the conjugate of Po (Po*, computed by the conjugator 703) in the multiplier 704 to give the quantity Z=A+jB used in the previous explanation.

The square of the modulus of Z (the complex amplitude of the interference) is computed by the device 705 and the quantity r in the device 706.

The rest of the system 700 is designed to compute the corrected central signal sample.

The mean of the squares of the moduli of the signal is computed from the signal S2 re-standardized by the multiplier 707 using the delay line 708, the adder/subtracter 709 and the accumulator 710.

The delay line 708 for its part also has an initial delay to compensate for that of the system 200.

The assembly comprising the accumulator, the delay line and the adder/subtracter is configured to give the mean of the squares of the moduli of the sample to be corrected and of its K neighbors at output of the accumulator.

Then, from the output of the accumulator, the subtracter subtracts the square of the modulus of Z to obtain the quantity delta referred to further above.

The device 712 computes the weight w(0) to be applied to the central sample and the common modulus of the neighboring weights |w(k)| (applied to the other samples) which respectably weight the signal S0 in the multiplier 713 and the signal S1 in the multiplier 714 before addition in the summator 715.

The output of the summator 715 is finally multiplied by the conjugate complex exponential Po* by means of the multiplier 716 which finally gives the corrected signal central sample, with the right phase.

It is also possible to multiply S0 and S1 directly by Po* and not carry out the final multiplication, and/or integrate the multiplication operations by constants in the system of computation 712.

Figure 5:
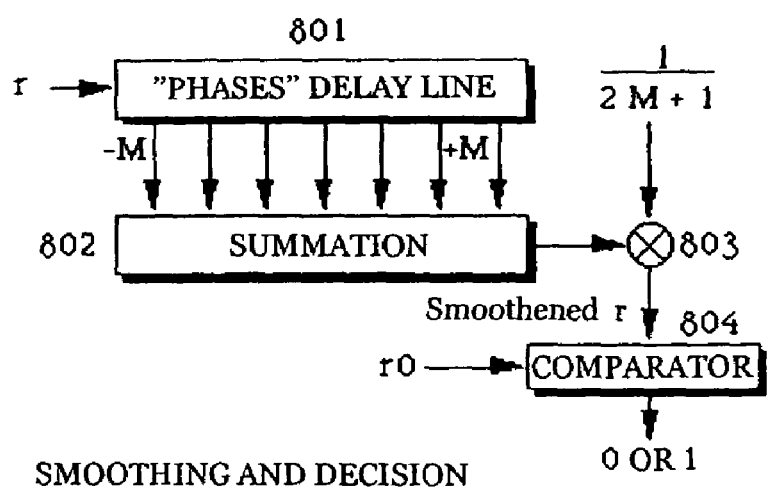
FIG. 5 is a detailed view of the smoothing and decision-making system of FIG. 1.

FIG. 5 gives a detailed view of the smoothing system 800 which decides on the switching. The system comprises at least:

One delay line 801 whose outputs are summated in the summator 802.

The output of the summator is re-standardized by the multiplier 803 and compared with a threshold r0 in the comparator 804.

If the input of the comparator corresponding to the value of the ratio r is below r0, the comparator outputs the value 1, else it outputs the value 0.

The use of the multiplier 803 can be avoided by taking a threshold r0 that is (2 M+1) higher than its theoretical value.

What is claimed is:

1. A method for the rejection of interference in a payload signal, comprising the steps of:

a) evaluating an interference phase and evaluating an instantaneous amplitude of the interference by a least error squares method;

b) forming a ratio $r=(B^2/(A^2+B^2))$ where A is the real part of the complex amplitude of the interference and B is the imaginary part of the complex amplitude of the interference; and c) if r is below a threshold value r0, correcting the payload signal by replacing a central sample of the signal by a weighted sum formed by the central sample and neighboring samples.

2. The method according to claim 1, wherein the phase of the interference is evaluated by using a parabolic law and the amplitude of interference is evaluated by the least error squares method.

3. The method according to claim 1, wherein weighting coefficients include:

$$w(0) = \frac{2K(A^2 + B^2 + dAB2) + xy2}{(2K+1)(A^2 + B^2 + dAB2) + xy2} \quad (16)$$

$$w(0) = \frac{A^2 + B^2 + dAB2}{(2K+1)(A^2 + B^2 + dAB2) + xy2} e^{j(tete(0) - tete(k))} \quad k \neq 0$$

where K is the number of samples considered, k is the index of the sample,
A and B are the complex amplitudes of the interference,
dAB2 is the mean square error of estimation of A+jB,
xy2 is the mean power of the signal, and
teta(k) is the sequence of the smoothened phases.

4. The method according to claim 1, wherein the value of r is filtered and corresponds to the mean computed on the samples neighboring the central sample.

5. The method according to claim 1, comprising a step of automatic gain control of the signal before the correction step, and a step for the conversion of residual interference pulses into weaker pulses on the corrected signal.

6. A system for the rejection of interference phenomena in a signal comprising:
at least one decision-making device using coefficients (A, B) of the complex amplitudes of the interference; and
a device for the processing of the signal linked with the decision-making device, the processing device being adapted to the elimination, from a chosen sample of the signal, of the interference estimated from the samples neighboring and the samples preceding the chosen sample.

7. The system according to claim 6, comprising:
a selection device enabling the selection, as the chosen sample, of the central sample of the signal.

8. The system according to claim 6, wherein the processing device comprises:
a device for the estimation of the phase of the signal by means of a parabolic law; and
a device for the estimation of the complex amplitude of the signal in order to determine a ratio of the decision threshold.

9. The system according to claim 6, comprising:
an automatic gain control device placed before the processing device; and
a limiter device placed after the processing device.

* * * * *